July 12, 1932.  P. H. SCHAAD  1,866,676
SELF CLOSING OIL SAMPLING VALVE
Filed May 16, 1931
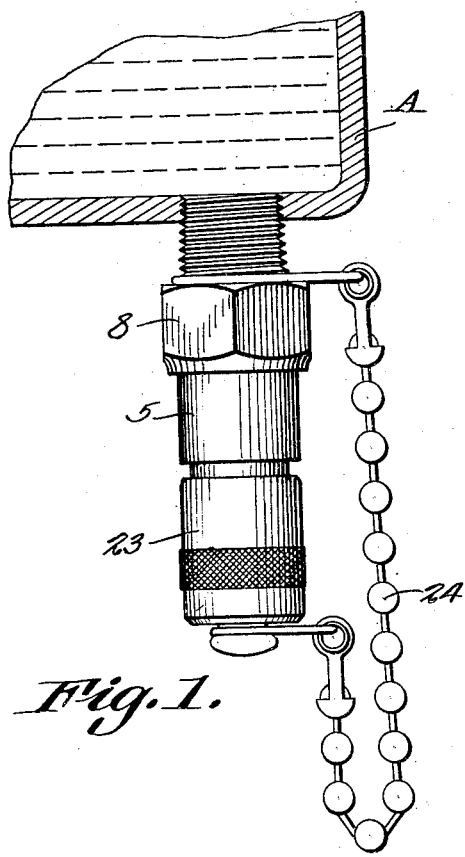
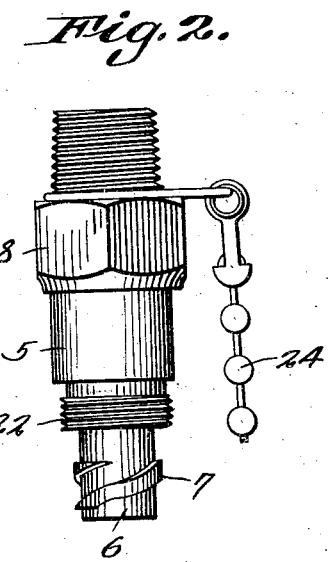
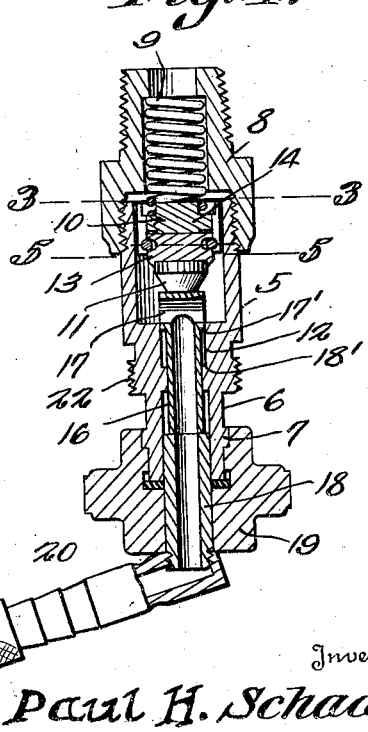
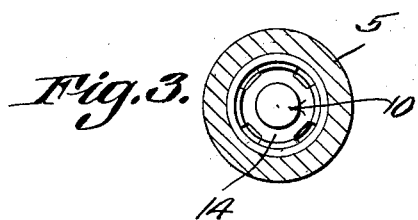
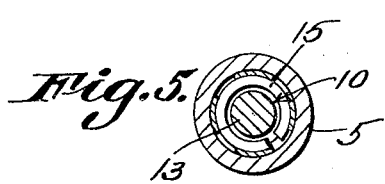
Inventor
Paul H. Schaad
By C. A. Snow & Co.
Attorneys.

Patented July 12, 1932

1,866,676

UNITED STATES PATENT OFFICE

PAUL H. SCHAAD, OF NEW YORK, N. Y.

SELF-CLOSING OIL SAMPLING VALVE

Application filed May 16, 1931. Serial No. 537,928.

This invention relates to a self closing oil sampling valve, designed for use in connection with transformers, the primary object of the invention being to provide a valve which may be operated to release a quantity of oil from the transformer to which the valve is secured, when the coupling forming a part of the invention, is positioned on the discharge end of the valve.

An important object of the invention is to provide a valve of this character including a master key or valve construction, to the end that all of the transformer valves of a particular factory or plant, may be operated by a single key carried by the expert charged with the responsibility of testing the oil of transformers, thereby insuring against any possibility of the oil of the transformers being tampered with by unauthorized persons.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a fragmental elevational view illustrating a transformer equipped with a self closing valve, constructed in accordance with the invention.

Figure 2 is an elevational view of the valve, the cover thereof being removed.

Figure 3 is a sectional view taken on line 3—3 of Figure 4.

Figure 4 is a longitudinal sectional view through the valve.

Figure 5 is a sectional view taken on line 5—5 of Figure 4.

Figure 6 is an elevational view of the valve member.

Referring to the drawing in detail, the valve includes a body portion 5 that has a contracted lower portion 6 formed with cam threads 7, for purposes to be hereinafter more fully described.

Secured to the body portion 5, is a union 8 formed with threads to be positioned in the threaded opening formed in the bottom of the transformer with which the valve is used, the transformer housing in the present showing being indicated by the reference letter A.

As shown by Figure 5 of the drawing, the union 8 is formed with a central enlarged opening providing a housing for the coiled spring 9 that has its opposite end resting against the valve member 10 that has a tapered extremity 11 adapted to fit within the bore 12 of the contracted lower porion 6 of the valve body, to cut off the flow of liquid through the valve body.

The valve member 10 embodies a lower section 13 and and upper section 14, the sections being held together by means of the expansion split ring member 15 which is held by the lower section, and expands into recesses formed in the upper section.

The reference character 16 designates a tube that is formed with a transversely disposed opening 17 at its upper end, which opening is normally held below the upper edge of the bore 12, so that the passage of liquid through the tube will be prevented. The tube 16 is substantially long and normally extends to a point near the end of the contracted lower portion of the valve body, so that it may be engaged by the tube 18, forming a part of the key 19.

Near the upper end of the tube 16, is a shoulder 17′ that engages the shoulder 18′ of the body portion to restrict movement of the tube, and allow the valve 11 to seat.

This key 19 is in the form of a nut which is provided with internal cam threads of a construction to fit the cam threads 7 of the contracted lower portion of the valve body, to the end that when the key 19 is positioned against the discharge or contracted end of the body portion, and rotated, the key will be moved longitudinally of the contracted lower portion of the body portion, causing the tube 19 to engage the tube 16, raising the tube to a position to allow oil to pass through the valve body and tubes 16 and 18. It will of course be understood that a pipe 20 is connected with the lower end of the tube 18 and provides means for securing a suitable hose, such as indicated at 21, to the pipe to direct the oil, to a suitable container not shown.

From the foregoing it will be obvious that the construction embodying the tube and key 19 is such that the pipe 20 may swivel, so that the discharging position of the pipe and hose may be varied, to meet various requirements.

Threads 22 are formed on the contracted lower portion of the valve and are adapted to cooperate with internal threads formed on the cap 23, that normally closes the lower end of the valve. A chain indicated by the reference character 24 is connected with the valve body, and has swivel connection with the cap 23, to the end that when the cap 23 is removed, the cap cannot be lost or misplaced.

In the use of the device it is contemplated to provide a single key for operating all of the valves of the transformers of a plant or factory, the key to be carried by the expert in charge of the testing of the oil in the transformers. It will of course be seen that the cam threads of the contracted end portion and the key, are made in a particular manner, so that it is necessary to provide a certain key to operate the valve, thereby insuring against the operation of the valve, to obtain a sample of the oil, by unauthorized persons. After a sample has been taken, the cap 23 is of course replaced, to guard the discharge end of the valve.

I claim:

1. A self closing valve for transformers, comprising a body portion having a central passageway, a tube slidably mounted within the central passageway, a valve member mounted within the passageway and adapted to control the passage of liquid through the body portion, said valve member comprising an upper section and a lower section, yieldable means for removably securing the sections of the valve together, said upper section having notches to permit liquid to pass through the valve, said tube adapted to engage the valve to unseat the valve, and a spring bearing against the valve to normally seat the valve.

2. A self closing valve for transformers comprising a body portion having a central passageway, a valve member within the passageway for controlling the passage of liquid through the passageway, said valve member comprising an upper section and a lower section, the lower section having an annular groove, a split ring member within the annular groove, said upper section having a groove, said split ring member adapted to expand into the groove of the upper section to secure the sections together, means for unseating the valve member, and means for normally holding the valve member to its seat.

In testimony that I claim the foregoing as my own, I have hereto affixed my signature.

PAUL H. SCHAAD.